Patented Nov. 27, 1951

2,576,219

UNITED STATES PATENT OFFICE 2,576,219

METHODS AND MATERIALS FOR EMBALMING JAUNDICED BODIES

Frank X. Grossi, St. Louis, Mo., assignor to Royal Bond, Inc., St. Louis, Mo., a corporation of Missouri No Drawing. Application August 20, 1947, Serial No. 769,763

6 Claims. (Cl. 27—22)

This invention relates in general to the art of embalming, and, more particularly, to certain new and useful improvements in methods and materials for the embalming of jaundiced bodies.

Undertakers and embalmers, at the present time, encounter great difficulty in embalming jaundiced bodies, that is to say, a body which, due to liver malfunction either in life or at death, assumes a yellow or greenish-yellow complexion due to the accumulation in the tissues of bile pigments. Such conditions are encountered not only in cases where death has resulted from diseases such as yellow jaundice, but also in many cases where, as a part of the final complications immediately prior to death, a malfunctioning of the liver sets in. In fact, malfunctioning of the liver is quite frequently associated with the final dissolution of organic functions attendant upon death, so that a fairly large number of bodies are in a moderately jaundiced condition by the time the embalming procedure is commenced. Formaldehyde, which is the principal active agent in most embalming fluids, reacts with the bile pigments to produce biliverdin, which is an insoluble green pigment and imparts to the tissues and flesh of the corpse a very unnatural sallow greenish hue. In cases where the jaundiced condition is fairly advanced, the green coloration results in a very unsightly and almost hideous effect. Because the bile pigments present in a jaundiced body are relatively insoluble, such pigments are not removed as the arterial system of the corpse is drained, so that a substantial quantity of bile pigments will be present in the tissues for chemical reaction with the formaldehyde as the embalming fluid permeates the body.

Heretofore, no satisfactory method for handling a jaundiced body has been provided. At the present time, undertakers and embalmers, in embalming jaundiced bodies, frequently resort to embalming fluids containing relatively large percentages of various red dyes and a relatively low percentage of formaldehyde, but such solutions are not particularly efficient in preservative action and do not effectively mask the unwanted green coloration. Some effort has also been made to employ organic oxidizing agents such as benzoyl peroxide, and tertiary butyl hydroperoxide to bleach or degrade the bile pigments, but unfortunately chemical action of these organic oxidizing agents is not completely effective upon the bile pigments and produces a further discoloration of the body due to chemical action on the blood with the resultant formation of oxy-hemoglobin. Many undertakers and embalmers simply employ very heavy applications of cosmetics, but such procedure usually results in endowing the body with a highly theatrical and unnatural appearance.

It is hence the primary object of the present invention to provide methods and materials for embalming jaundiced bodies which produce a natural life-like coloration in the tissues of the body without impairment of the preservative action of the embalming fluid.

It is another object of the present invention to provide methods and materials for embalming jaundiced bodies which are simple, convenient and economical, and require no unusual time-consuming or expensive accessory techniques.

It is a further object of the present invention to provide methods and materials for embalming jaundiced bodies through which the unnatural yellowish or greenish coloration imparted to the skin by the bile pigments can be effectively counteracted and removed during the embalming procedure.

With the above and other objects in view, my invention resides in the novel processes and compositions of matter presently described and pointed out in the claims.

Broadly speaking, the present invention depends upon the unique and original discovery of an unfailing chemical reaction involving the bile pigments normally present in the body tissues of a jaundiced body. It has been discovered, in connection with the present invention, that bilirubin, which is the bile pigment predominantly present in the tissue of a jaundiced body, will react with a diazo compound in a non-acidic medium preferably ranging from pH 8 to pH 14, with the resultant formation of a water soluble compound which has a red blood-like color and may be drained quite completely from the body with the blood and other body fluids. This resultant compound is, furthermore, nonreactive with formaldehyde and, for all practical purposes, retains its reddish coloration so that whatever quantity of such compound may not be drained from the system will impart a life-like rosy color to the flesh which is entirely pleasing from the cosmetic point of view.

The reaction may be generally represented as follows:

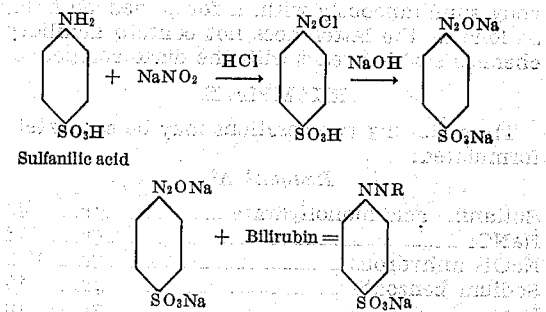

wherein R represents the bilirubinyl radical. The above reaction is instantaneous at room temperature and, once completed, the possibility of oxidation of yellow bilirubin to green biliverdin is eliminated.

Similarly, it has been found possible to obtain the same coupling reaction with diazotized compounds of metanilic acid, 4-amino toluene 2-sulfonic acid, and 4-amino toluene 3-sulfonic acid. It therefore becomes evident that the bilirubinyl radical will combine with a diazotized aryl sulfonic acid to form a water-soluble reddish compound which is unreactive to formaldehyde. The fact that diazotized aryl sulfonic acids may assume one or more isomeric forms is apparently of no significance because of the bilirubinyl radical will combine equally well with such isomers to form a stable water soluble bilirubinyl complex.

By way of illustration, and not by way of limitation, the following are examples of preferred methods and agents which have been found to be effective:

EXAMPLE I

The following two solutions are formulated:

*Reagent $A^1$*

| | |
|---|---|
| Sulfanilic acid | gr 7½ |
| Hydrochloric acid (20° Bé.) | ml 75 |
| Water—quantity sufficient to make up to volume of one pint | |

*Reagent $B^1$*

| | |
|---|---|
| Urea | gr 10 |
| Sodium benzoate | gr 10 |
| Sodium nitrite | gr 5 |
| Sodium hydroxide | gr 40 |
| Water—quantity sufficient to make up to volume of one pint | |

The above two reagents are relatively stable and may be stored for reasonable lengths of time in separate containers. Immediately prior to embalming a jaundiced body, equal volumes of Reagent $A^1$ and Reagent $B^1$ are mixed together preferably, though not necessarily, in an externally iced pan or container so that the resulting mixture is kept cool. The resulting liquid is then injected into the corpse and circulated with the drainage fluid for a short while prior to the introduction of embalming fluid. As soon as the fluid resulting from the mixture above described has penetrated the tissues, the bilirubin will be converted to the bilirubinyl complex above described, and co-mingled with and dissolved in the aqueous drainage fluid so as to be withdrawn from the corpse therewith to effect substantially complete removal, in such manner, of the bilirubin. Thereafter, a formaldehyde-containing embalming fluid may be injected into the body in the conventional manner. If discharged, the fluid resulting from the mixture of Reagents $A^1$ and $B^1$ can be added to, and injected into the body simultaneously with, a formaldehyde fluid, so long as the latter does not contain auxiliary chemicals which react with the diazo compound.

EXAMPLE II

The following two solutions may be separately formulated:

*Reagent $A^2$*

| | |
|---|---|
| Sulfanilic acid monohydrate | gr 40 |
| NaNO₂ | gr 14 |
| NaOH anhydrous | gr 13.3 |
| Sodium benzoate | gr 10 |
| Urea | gr 10 |
| Water—quantity sufficient to make up to volume of one pint | |

*Reagent $B^2$*

| | |
|---|---|
| Hydrochloric acid (20° Bé.) | gr 40 |
| Water—quantity sufficient to make up to volume of one pint | |

Reagents $A^2$ and $B^2$ are mixed in equal proportions. Since the diazonium salt is unstable, the reagents should be cooled and diluted with cold water prior to injection. The lowered temperature favors the stability of the compound as well as the coupling reaction with the bile pigments. Sodium benzoate is introduced as a buffer as well as an aid to the coupling reaction.

EXAMPLE III

Where it is desired to combine the preservative qualities of an embalming fluid with the jaundice reagents, fluids of the following type may be formulated:

*Reagent $A^3$*

| | |
|---|---|
| Formalin | gr 250 |
| Glycerol | gr 20 |
| Sodium benzoate | gr 10 |
| Sulfanilic acid monohydrate | gr 20 |
| NaOH anhydrous | gr 6.7 |
| Surface active cationic agent (dry basis) | gr 3 |
| NaNO₂ | gr 7 |
| Eosin dye to suit | |
| Water—quantity sufficient to make up to volume of one pint | |

*Reagent $B^3$*

| | |
|---|---|
| Hydrochloric acid (20° Bé.) | gr 20 |
| Urea | gr 10 |
| Water—quantity sufficient to make up to volume of one pint | |

Reagent $A^3$ is mixed with Reagent $B^3$ in the cold in equal proportions, diluted, and injected arterially. While the above reagents, when mixed, eliminate the requirement of a separate embalming fluid, a minor disadvantage exists due to a small loss of formaldehyde from condensation or Cannizzaro reaction in presence of alkalis.

The above formulations can be varied and substitutions made in molecular equivalents. Other bases, such as potash, potassium carbonate or sodium carbonate, work equally well. Sulfuric acid or any strong organic or inorganic acid will work as well as hydrochloric acid. The substitutes for sulfanilic acid have already been mentioned. It should be understood that changes in the methods, compositions, percentages, and combinations above set forth may be made without departing from the nature and principle of my invention.

Having thus described my invention, what I claim and desire to secure by Letters Patent is:

1. The method of embalming jaundiced bodies which comprises initially injecting into the body a diazotized chemical compound which combines with bile pigments to produce a water soluble reaction product, thereupon draining the body fluid from the corpse, and finally injecting into the body a preservative agent.

2. The method of embalming a jaundiced body which comprises chemically combining the bile pigments with a diazo compound and thereby converting the bile pigments to water soluble form whereby to cause them to become dissolved in the body fluids, draining off the body fluids thus containing dissolved products resulting from conversion of bile pigments, and thereupon injecting embalming fluid into the body.

3. The method of embalming jaundiced bodies which comprises injecting into the body a diazotized aryl sulfonic acid to produce a water soluble reaction product, thereupon draining the body fluid, and finally injecting into the body a preservative agent.

4. The method of embalming jaundiced bodies which comprises injecting into the body a diazotized aryl sulfonic acid in an alkaline medium to produce a water soluble reaction product, thereupon draining the body fluid, and finally injecting into the body a preservative agent.

5. The method of embalming jaundiced bodies which comprises injecting into the body a diazotized aryl sulfonic acid under conditions of alkalinity ranging from pH 8 to pH 14 to produce a water soluble reaction product, thereupon draining the body fluid, and finally injecting into the body a preservative agent.

6. An embalming preparation containing less than 10% of a diazo compound.

FRANK X. GROSSI.

REFERENCES CITED

The following references are of record in the file of this patent:

UNITED STATES PATENTS

| Number | Name | Date |
| --- | --- | --- |
| 1,942,407 | Black | Jan. 9, 1934 |
| 2,117,251 | Kleiderer | May 10, 1938 |
| 2,138,559 | Straub et al. | Nov. 29, 1938 |
| 2,337,845 | Zervas | Dec. 28, 1943 |
| 2,388,260 | Friedheim | Nov. 6, 1945 |